No. 672,923. Patented Apr. 30, 1901.
B. A. STEVENS.
FOOT BATH.
(Application filed Nov. 16, 1900.)

(No Model.)

WITNESSES.

INVENTOR.
Benjamin A. Stevens
by Parker Burton
Attorneys.

UNITED STATES PATENT OFFICE.

BENJAMIN ABBOTT STEVENS, OF TOLEDO, OHIO.

FOOT-BATH.

SPECIFICATION forming part of Letters Patent No. 672,923, dated April 30, 1901.

Application filed November 16, 1900. Serial No. 36,663. (No model.)

*To all whom it may concern:*

Be it known that I, BENJAMIN ABBOTT STEVENS, a citizen of the United States, residing at Toledo, county of Lucas, State of Ohio, have invented a certain new and useful Improvement in Foot-Baths; and I declare the following to be a full, clear, and exact description of the invention, such as will enable others skilled in the art to which it pertains to make and use the same, reference being had to the accompanying drawings, which form a part of this specification.

My invention relates to foot-baths; and the object of my improvements is to provide an improved apparatus for applying water at a high temperature to the foot and lower part of the leg and maintaining said temperature constant or altering it by degrees, as desired. I secure this object by the device illustrated in the accompanying drawings, in which—

Figure 2:
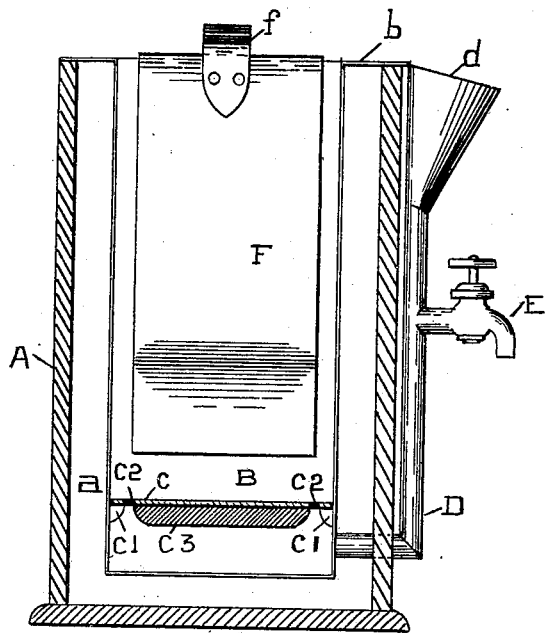
Figure 1:
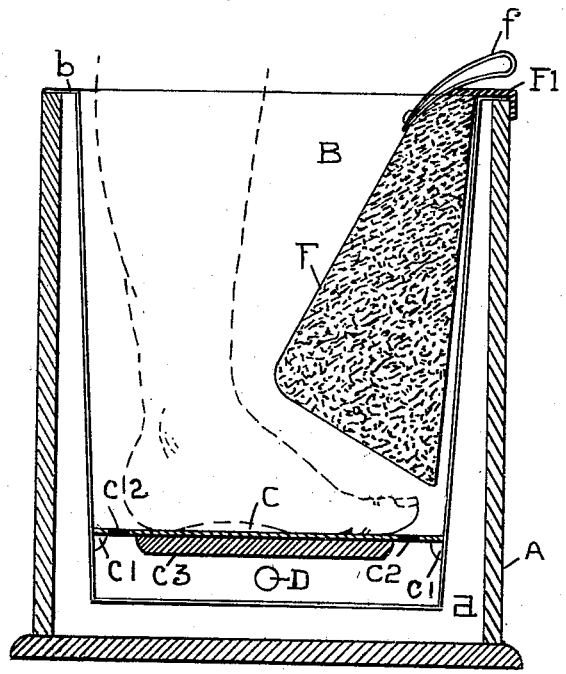

Figure 1 is a vertical longitudinal section. Fig. 2 is a vertical cross-section.

The same letters indicate the same parts in both views.

A is a tank, which I make of wood with the opposite sides parallel. B is a smaller tank having the general shape of the tank A and provided with flanges $b$ around its upper edge. The tank B is placed within the tank A, concentric therewith, its flanges $b$ resting upon the upper edge of the tank A and its bottom coming near to or upon the bottom of the tank A. The tank B being smaller than the tank A, an air-space $a$, surrounding the former, is left between the two tanks, which tends to prevent the heat from escaping from the water and to keep the side walls of the tank A cool.

C is a false bottom resting upon ledges $c'$ near the bottom of the tank B. The false bottom C is provided with perforations $c^2$ around its edge, and along its center, where the foot rests, it is provided with heat insulation $c^3$.

D is a tube extending downward from the top of the tank, passing through a wall of the tank A, and entering the tank B below the false bottom C.

$d$ is a funnel at the top of the tube D.

E is a cock in the tube D.

F, Fig. 1, is a sheet-metal box, roughly triangular in shape and provided with a hook F' at its upper end, by which it may be suspended upon the side of the tank.

$f$ is a bail or lug by which the box F may be lifted.

A weight of the same shape may be substituted for the box F.

The box F is filled with sand or other heavy material and is of such a length that its lower end will be a sufficient distance above the bottom of the tank B to permit the foot to pass under it, as indicated by dotted lines in Fig. 1, when it is hung inside of said tank by the hook F'.

The operation of the above-described device is as follows: The foot is placed upon the false bottom C in the tank B, and the box F is hung in place, as indicated in Fig. 1. Water at a moderate temperature is now poured into the funnel $d$, descends the tube D, and enters the tank B below the false bottom C and rises in said tank through the perforations in said bottom. The tank B may be filled or partly filled in this way. When sufficient water has been introduced into the tank B, it will then be desirable to raise its temperature. For this purpose hot water is poured into the funnel $d$ and enters the tank B under the false bottom C, from whence it gradually rises and warms the entire body of water. If the tank B is as full as it is convenient to have it, some of the water at the bottom, where the colder water will be, is drawn out through the cock E, and said cock is then again closed and more water added through the funnel $d$ and tube D, as above described.

The object of the box F is to occupy space, so that it will require less water to fill the tank.

What I claim is—

1. In a foot-bath, the combination of a tank, a false bottom provided with perforations near the edge, and being heat-insulated at its central portion, said false bottom being located in said tank a short distance above the true bottom, a tube communicating with said tank between said bottoms, extending toward the top of said tank and adapted to have water poured into it at its upper end, and a cock upon said tube adapted to draw water from said tank, substantially as and for the purpose set forth.

2. A foot-bath consisting of an outer tank A, an inner tank B, said tanks being so located with reference to each other as to leave a space a, between them, a tube D, extending through the tank A, communicating with the bottom of the tank B, extending outside of the tank A, to the level of the top of said tanks, said tube being open at its upper end, and provided with a cock E, below its upper end outside of the tank A, substantially as described.

3. In a foot-bath, the combination of a tank, a removable weight adapted to be supported in said tank as and for the purpose described, a tube communicating with the bottom of said tank, extending toward the top of said tank and being open at its upper end, and a cock upon said tube adapted to draw water off from said tube at a point below the normal level of the water in said tank, substantially as described.

In testimony whereof I sign this specification in the presence of two witnesses.

BENJAMIN ABBOTT STEVENS.

Witnesses:
J. K. HAMILTON,
ROY R. STUART.